(12) United States Patent
Lowrance

(10) Patent No.: US 6,981,420 B2
(45) Date of Patent: Jan. 3, 2006

(54) OMNI-DIRECTIONAL MOVEMENT SENSOR

(76) Inventor: Arlen J. Lowrance, 6921 S. Gary, Tulsa, OK (US) 74136

( * ) Notice: Subject to any disclaimer, the term of this patent is extended or adjusted under 35 U.S.C. 154(b) by 147 days.

(21) Appl. No.: 10/724,417

(22) Filed: Dec. 1, 2003

(65) Prior Publication Data
US 2005/0115322 A1 Jun. 2, 2005

(51) Int. Cl.
*G08V 13/24* (2006.01)
(52) U.S. Cl. .......................... 73/652; 73/654; 340/689; 340/566
(58) Field of Classification Search .................. 73/654, 73/652, 572, 587, 579; 340/566, 689, 572
See application file for complete search history.

(56) References Cited
U.S. PATENT DOCUMENTS

| | | | | |
|---|---|---|---|---|
| 1,332,613 A | * | 3/1920 | Damon | ........................ 116/33 |
| 4,322,714 A | * | 3/1982 | Morgan | ........................ 340/427 |
| 4,527,153 A | * | 7/1985 | Suzuki et al. | ............. 340/572.2 |
| 4,723,447 A | * | 2/1988 | Laing | ........................... 73/654 |
| 5,986,548 A | * | 11/1999 | McGregor | ............. 340/539.26 |
| 2003/0122039 A1 | * | 7/2003 | Mollet et al. | ............ 246/473 R |

* cited by examiner

Primary Examiner—Hezron Williams
Assistant Examiner—Rose M. Miller
(74) Attorney, Agent, or Firm—William S. Dorman

(57) ABSTRACT

A microphone is enclosed in a semi-sound insulated housing with a jingle bell type device that generates sound in response to a very slight movement and/or vibration of the housing and/or a structure to which the housing is attached. The sensor's sound insulated housing in cooperation with the microphone's adjustable sound sensitivity circuitry is designed for making the microphone responsive exclusively to the internally generated sound of a jingle bell sound generating type device in response to a movement/vibration of the sensor.

1 Claim, 4 Drawing Sheets

OMNI-DIRECTIONAL MOVEMENT SENSOR

BACKGROUND OF THE INVENTION

1. Field of the Invention

The present invention relates to a sound sensor uniquely designed for detecting a movement/vibration of an object even if the object is moved/vibrated silently, (i.e. hand rotated without emitting a sound). Even more particularly, a microphone is enclosed in a sound insulated housing with a jingle bell type device that generates sound in response to a movement/vibration of the object to which it can be omni-directionally attached via Velcro, etc.

2. Prior Art

Movement sensors are well known and are used in a variety of applications. In some applications, the movement sensors are designed to detect movement in a predetermined direction. In other applications, the movement sensors are designed to detect movement in more than one direction. The present invention is directed particularly at omni-directional movement sensors and will be described with particular reference to the use of such a sensor in a multi-sport event timing, motor vehicle security and alarm system, shutting down engine/motors due to excessive vibration, closing of gas valves in case of earthquake vibration etc.

U.S. Pat. No. 4,648,273 discloses a device for detecting the influence of gravitational forces on a flowable body contained within a cavity. The device is designed particularly for use in rocketry and space flight programming and instrumentation. However, the device is designed particularly to measure not only acceleration but also to determine the state of zero gravity at which time the flowable material forms a sphere due to the surface tension of the medium.

Japanese Patent Abstract No. 59-202067 (Mitsubishi Denki KK) discloses a three-axial direction acceleration detecting apparatus which includes a sphere supported by springs within a hollow container. Acceleration of the container causes the sphere to move relative thereto and that movement is detected by a light source on each of the yawing, rolling and pitching axes.

Japanese Patent Abstract No. JP 6-258336 relates to an acceleration sensor which uses a liquid metal ball within a sphere. Shadows of the liquid ball are projected onto multi-element photo detectors. Acceleration causes the ball to deform in shape and the change in the shape of the shadow is measured as a function of the acceleration.

Japanese patent Abstract No. JP 6-258337 shows a sensor in which movement is detected by sensing changes to the size of the shadow of a ball within a sphere and detecting the shadow position using a multi-element photo detector.

Kolefas U.S. Pat. No. 5,883,569 discloses a microphone functioning as a target strike sensor.

Moore U.S. Pat. No. 5,749,324 shows an apparatus for controlling animal behavior comprising a sound-processing means selectively responsive to a plurality of sounds. The sound actuated switch of Moore is responsive to external sounds such as a dog bark, human voice commands, etc.

Chen U.S. Pat. No. 6,000,493 discloses a sound activated speaker which is responsive to external sounds of music.

Sheck U.S. Pat. No. 6,367,800 discloses a projectile impact location determination system which includes a damage resistance strike plate having a planar surface adapted to be impacted by a projectile. The projectile impact location determination system uses a plurality of pressure sensors that are disposed in the plate for detecting a pressure disturbance event outwardly propagating through the plate from the impact location on the planar surface.

Sellman U.S. Pat. No. 3,603,590 discloses an apparatus for recording hit results activated by shockwave energizing hit detectors. The acoustics signal-generating mans includes a transducer at the target which produces a signal for each projectile passing in the vicinity of the target, and the amplitude of such signal is a function of the closest distance reached between the projectile and target during the projectile's trajectory.

Botarelli U.S. Pat. No. 5,095,433 discloses a target reporting system utilizing a flexible target sheet having a target image thereon. Preferably, the sheet is positioned in a substantially planar configuration. A plurality of sensors affixed to the target sheet are arranged for detecting vibrations at selected locations on the sheet. The sensors comprise three piezoelectric cell adhesively affixed to the target sheet.

Zaenglein U.S. Pat. No. 5,194,006 discloses a shooting simulating process and training device which includes a microprocessor and special projectile sensing equipment the light sensing device can be comprised of an array of sensors.

Perkins U.S. Pat. No. 5,447,315 discloses a method and apparatus for sensing speed and position of projectile striking a target which includes several acoustic sensors.

Schachter U.S. Pat. No. 5,908,194 discloses a sport target device which is used to sense an impact of a ball over a wide area and to provide response to a user that said impact has occurred. The sensing mechanism is a low-cost acoustical sensor.

McAlpin U.S. Pat. No. 5,676,548 discloses a apparatus with which striking a target starts a timing sequence.

Patterson U.S. Pat. No. 6,615,770 discloses a device which deters certain animals, such as household pets, from being in certain areas of the house. In the Patterson device, a plurality of BB's are mounted in BB housings and certain transducers, microphones, are attached to the outside walls of the BB housings.

SUMMARY OF THE INVENTION

The present invention involves a movement/vibration detector sensor for use in connection with a game, for example. It should be understood that the present invention could be used to detect sound and or movement of other devices such as motor vehicles, the closing of gas valves in the case of earthquake vibration etc. However, as shown and described here the vibration/movement detection sensor is used in conjunction with a game where the player attempts to hit a first target and then, thereafter attempts to hit a second target, and possibly, a third target, all targets being arranged for contact in a predetermined sequence. The manner in which the targets are hit by the player who throws a projectile, such as a ball, or javelin etc, against the target first actuates the sensor to send a signal to a circuit which initiates a timing device. After hitting the required number of targets in sequence and, finally, hitting the target upon which the movement/vibration detector is mounted, this will shut off the timing device and therefore provide a lapse of time which can be used to measure the relative efficiency of the player.

The targets themselves can be made of plexiglass or any other flat surface and can be mounted on frames which support the targets at desired angles with respect to each other or merely to support the targets in spaced relation with respect to each other. Alternatively, the "targets" can be hoops through which basketballs traverse, in which case the vibration/movement sensor can be taped to the basketball net.

A significant feature of the present invention involves the combination of a jingle bell type sound emitter and a microphone both of which are mounted within the same chamber so as to be isolated from any exterior sounds. Sounds external to the sensor's housing are eliminated via its sound insulated housing in cooperation with the microphone's adjustable sensitivity circuitry. When the jingle bell type device moves in response to the impact (vibration) of a missile on the target, the microphone immediately transmits a signal to a circuit employed within the present invention and thereby initiates the operation of a timing mechanism.

The sensor housing when attached to a target actuates an electronic signal in response to the target's movement. Target movement occurs in response to being touched or vibrated. The sensor's microphone responds to sounds generated by the jingle bell by transmitting an electronic switch-actuating signal for actuating a multitude of actions such as:

a. Starting and stopping a stopwatch timed event i.e. the stopwatch starts with a first sport's target strike/movement then stops with a second sport's target strike/movement. Note: a sports target for sensor attachment does not have to be a rigid or flat surface: i.e. targets can be loosely hanging sport nets for: basketball, soccer, hockey, etc.

b. Closing gas valves in case of earth quake vibration. i.e. When the sensor detects earthquake vibrations, its switch actuating circuit generates a signal to close gas valves.

c. Shutting down an engine/motor due to excessive vibration.

d. Actuating an alarm in response to an intruder's tampering movement of doors, windows, vehicles, personal items, etc.

DETAILED DESCRIPTION OF THE PREFERRED EMBODIMENTS

Figure 1:
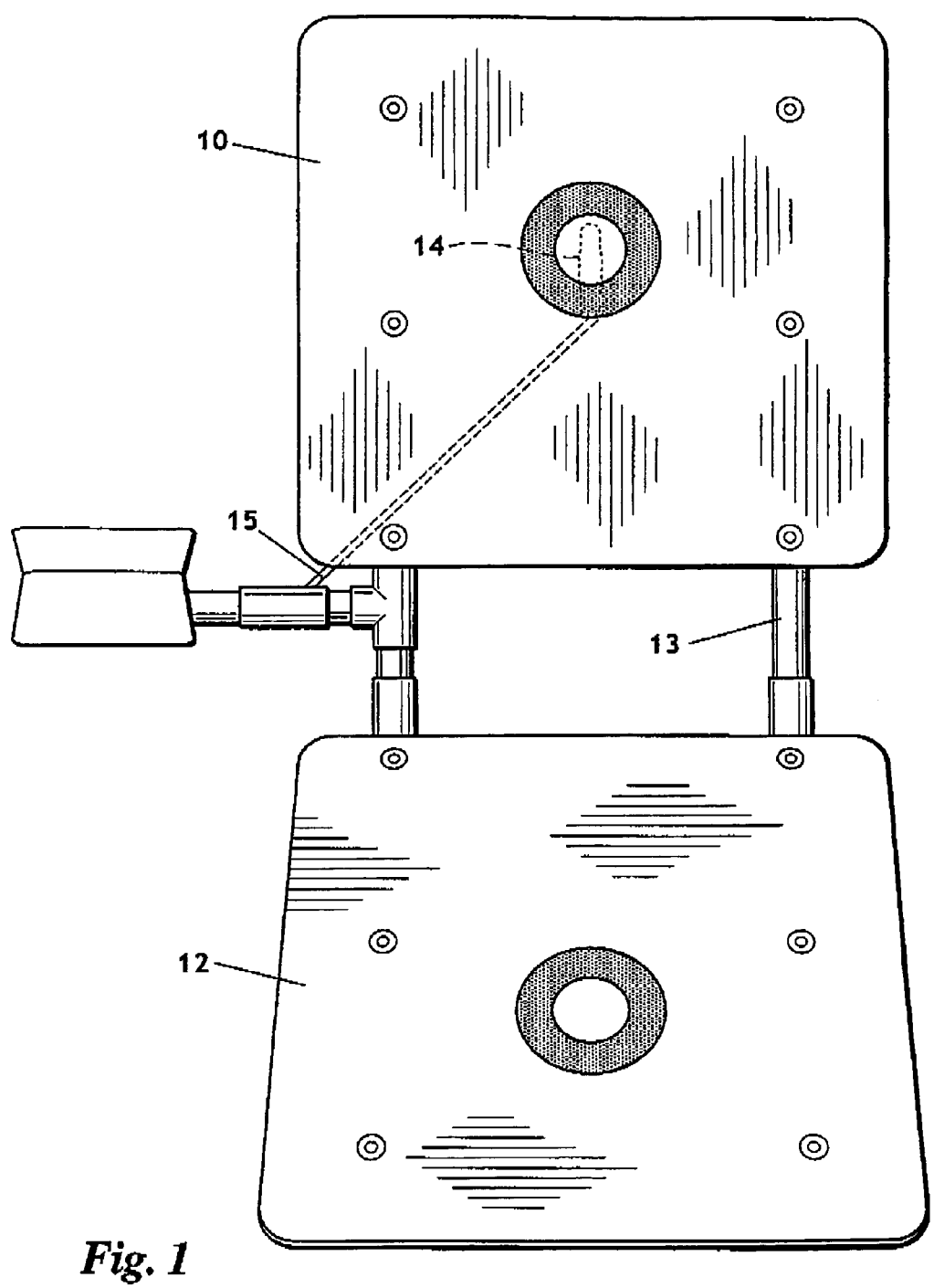
FIG. 1 is a perspective view of a pair of targets that are mounted on sheets of plexiglass material.

Referring to the drawings in detail, FIG. 1 shows an upper target 10 and a lower target 12 mounted on a frame structure 13 at an angle with respect to each other. Obviously, the targets could be mounted at any angle, right angle or straight.

Figure 2:
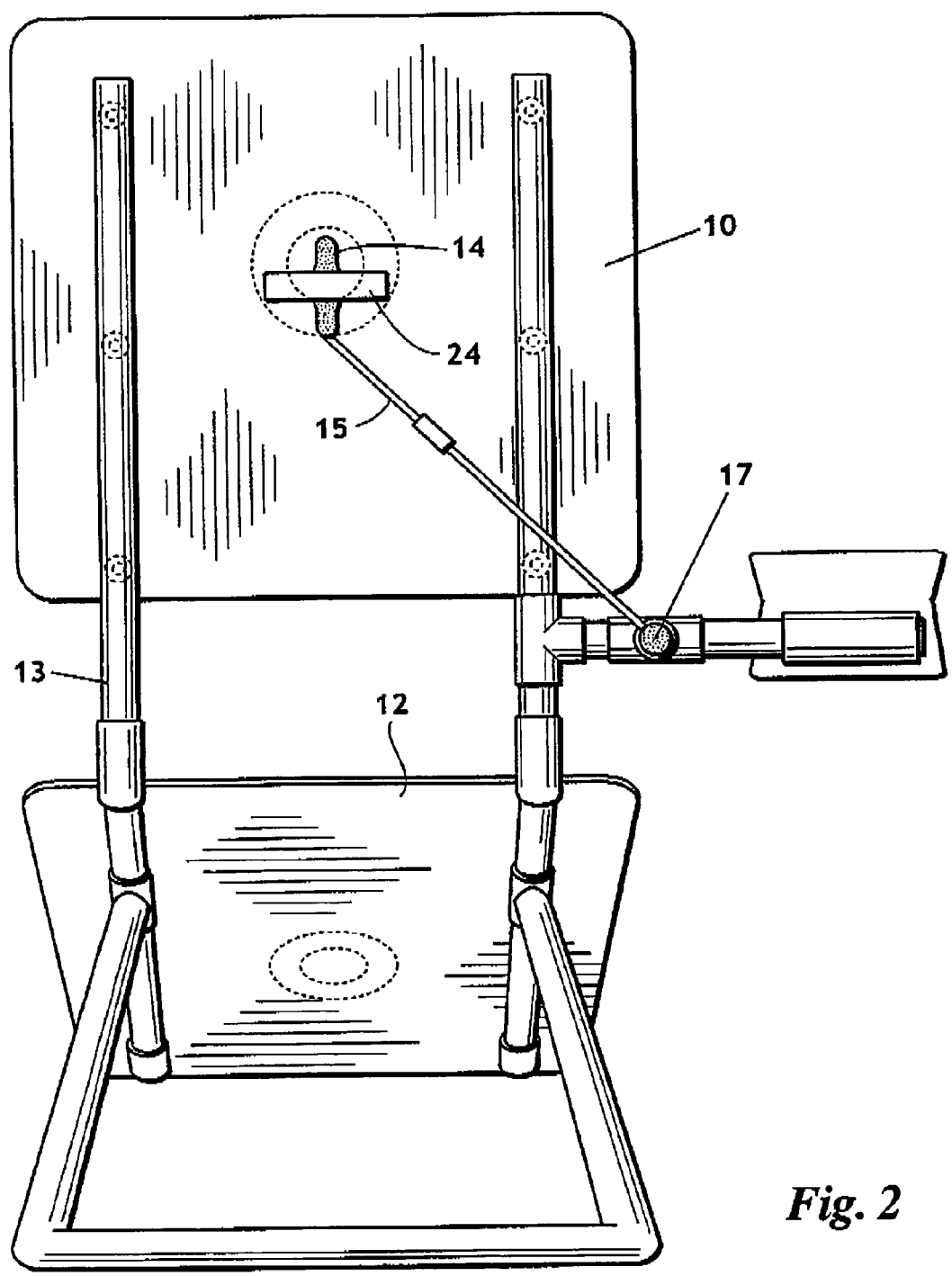
FIG. 2 is rear view of the targets shown in FIG. 1.

Looking at FIG. 2 it should appear that a sound sensor 14 is mounted on the rear of the upper target 10 and a pair of wires 15 connect from the sound sensor 14 (more particularly from the microphone therein) to a connector 17 which sends the signal to whatever location is desired.

Figure 3:
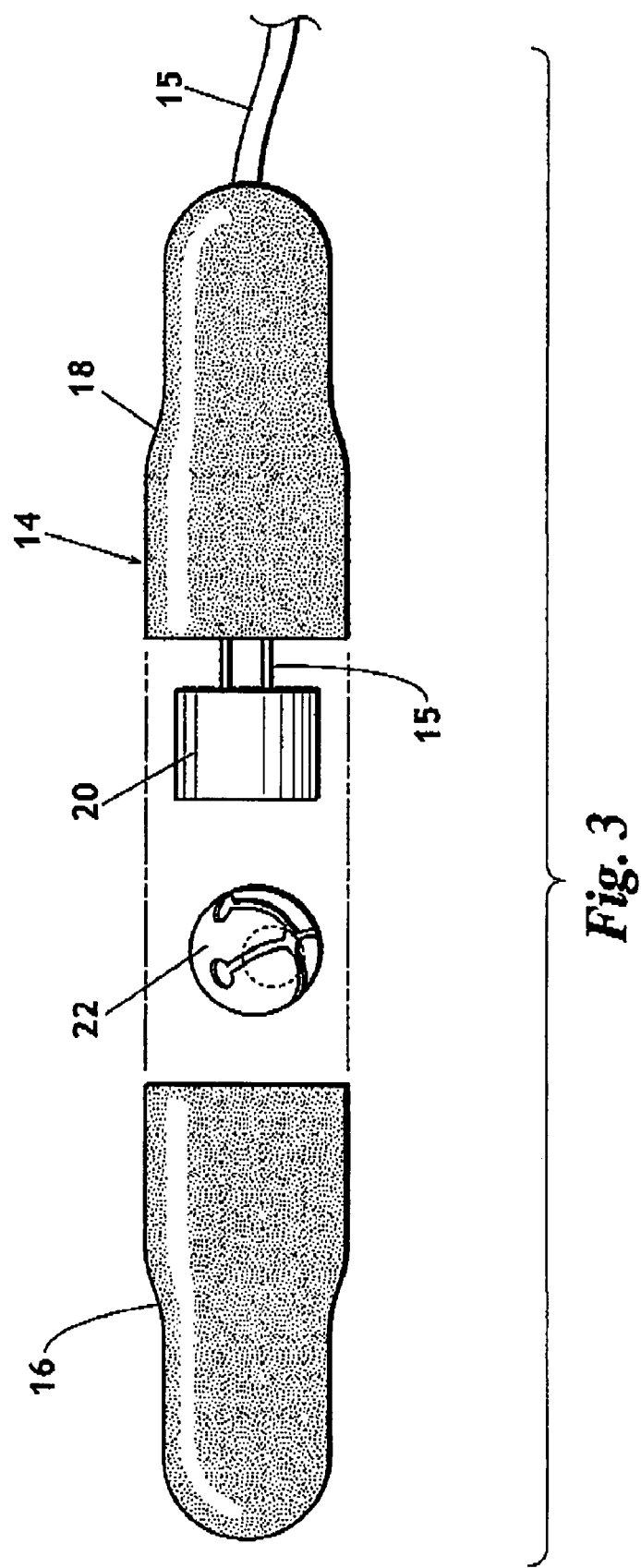
FIG. 3 is an exploded view showing the elements of the sound sensor which is used in connection with the targets of FIGS. 1 and 2.

Referring now to FIG. 3 in detail, the sound sensor 14 includes a pair of rubber or plastic capsules 16 and 18 similar to miniature nipples that go on baby bottles. The nipples 16 and 18 can be placed in telescoping relation when in use as in FIG. 2. A microphone 20 with leads 15 thereon will be supported within the two members 16 and 18 when they are placed together. Finally, a jingle bell device 22 is adapted to be mounted within the chamber comprising the two nipples 16 and 18 when they are telescoped together in the closed position. It should appear, therefor, that the sound admitting device, the jingle bell device 22, and the sound transferring device, the microphone 20, are mounted within the same chamber inside the sound sensor 14. The sound sensor 14 is mounted to the rear of the upper target 10 by means of an adhesive strip(s) 24 of Velcro® or equivalent adhesive material.

The leads 15 connect with conventional circuitry (not shown) which is adapted to transform the sound signal received by the microphone 20 into an electrical impulse which can be used to actuate a stopwatch (not shown) or some alarm device (not shown). The circuit referred to above will be adjusted, as to sensitivity, so that only the sound emitted by the jingle bell device 22 within the chamber 14 will actuate the stopwatch or alarm device. In other words, any sound or vibration external of the housing 14 will not be picked up by the microphone 20.

Figure 4:
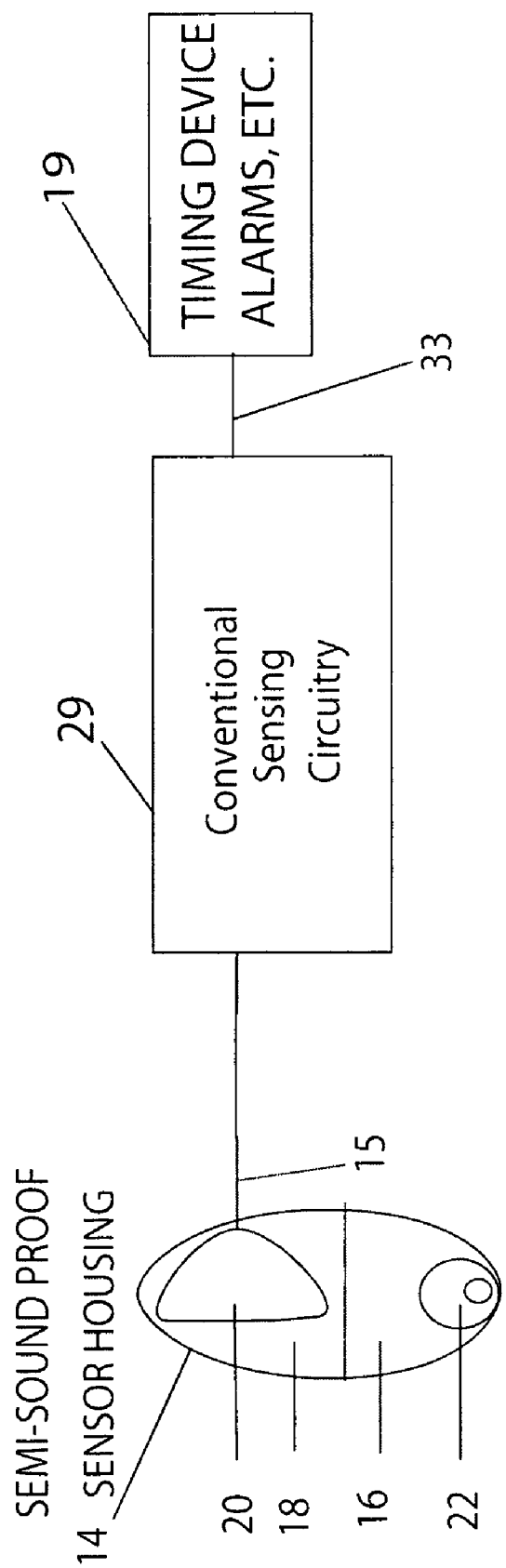
FIG. 4 is a circuit diagram of the sensing and control assembly for the present invention.

Referring now to FIG. 4 in detail, sensor housing 14 is composed of two parts, an upper housing 18 for mounting the sensors microphone 20 and a lower housing 16 for mounting the sensor's jingle bell 22. The leads 15 from the microphone connect with a conventional sensing circuitry 29 which in turn, has an output position 33 for connecting to timing devices, alarms, etc., 19.

What is claimed is:

1. A sound sensor mounted on a target or support and including a pair of open ended resilient capsules adapted to be placed in telescopic relation to form a closed chamber, a jingle bell device mounted within the chamber and a microphone also mounted within the chamber and responsive to sounds generated by the jingle bell device, the microphone being provided with connections extending externally from the chamber and connecting with a circuitry adapted to produce a signal for actuating a timing device or alarm device in response to an impact received by the support on which the sensor is mounted.

* * * * *